Jan. 27, 1959
R. F. CASEY
2,871,350
DELAY SWEEP CIRCUIT
Filed July 29, 1954
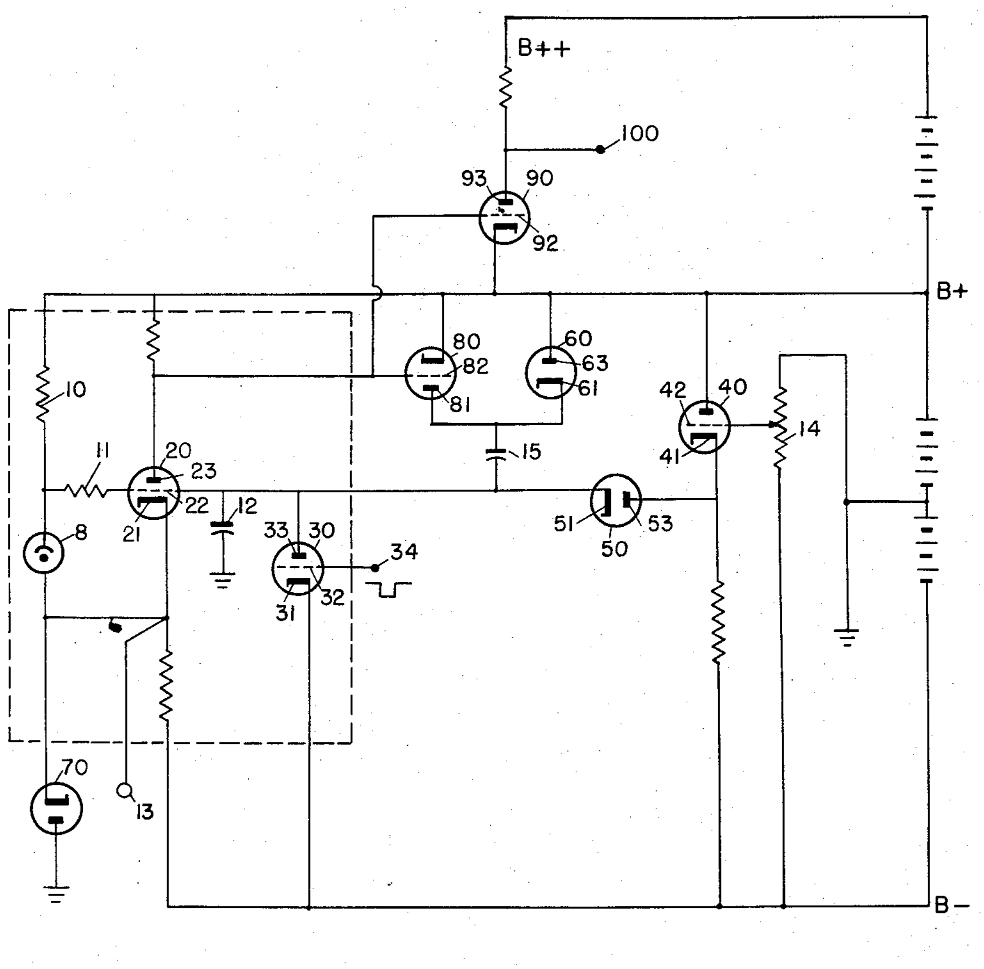
INVENTOR.
ROBERT F. CASEY
BY Darby & Darby
ATTORNEYS

United States Patent Office 2,871,350

Patented Jan. 27, 1959

2,871,350

DELAY SWEEP CIRCUIT

Robert F. Casey, Pompton Plains, N. J., assignor to Allen B. Du Mont Laboratories, Inc., Clifton, N. J., a corporation of Delaware Application July 29, 1954, Serial No. 446,430

10 Claims. (Cl. 250—27)

This invention relates to sweep circuits and in particular to an adjustable delay for such circuits to permit studying a phenomenon which occurs in a later portion of the waveform.

Heretofore delay circuits of this type have employed the increasing sweep-voltage to activate a trigger circuit while terminated the delay. Since a finite sweep-voltage was necessary for activation, a zero delay interval was not possible.

Another disadvantage with prior arrangements was the need of incorporating a second independent sweep circuit with resultant problems involved in a plurality of controls, tracking and synchronizing, as well as the additional expense in duplicating precision components.

In view of these factors one of the objects of this invention is to provide a sweep circuit with a delay which is reducible to a zero time interval.

Another object is to provide a delay sweep circuit which does not require duplication of precision components, and the other disadvantages of incorporating a second independent sweep circuit.

Still another object of the invention is to provide a brightness-voltage active only during the actual sweep so that the coating on the face of the tube is not burned during rest periods.

Another object of this invention is to provide a sweep-voltage circuit in combination with means for introducing a delay interval by cutting off conductivity of the sweep-tube by negatively biasing its grid.

A subsidiary object is to control the length of the delay interval by fixing the magnitude of the bias potential on the sweep-tube and by introducing additional capacitance for the purpose of slowly overcoming this bias.

Other and more detailed objects of the invention will be apparent from the following disclosure of the embodiment thereof illustrated in the accompanying drawings.

In the drawings, the single figure is a diagrammatic and schematic illustration of the combination comprising this invention.

For the purposes of this discussion "upvolting" is defined as raising a potential but not necessarily to a positive value. Similarly "downvolting" is lowering a potential but not necessarily to a negative value.

In the drawings the portion of the circuit within the dotted rectangle will be recognized as a linearized sawtooth sweep generator in which the resistors 10 and 11 determine the rate of charge of sweep capacitor 12. This generator consists of a triode 20 having an anode 23, a grid 22 and a cathode 21. The positive side B+ of a suitable potential source B is connected through the resistors 10 and 11 in series to the grid 22. Anode 23 is connected through the usual resistor to B+, and cathode 21 is connected through the usual resistor to B— of the source. Connected across the common point of resistors 10 and 11, and the cathode is a voltage regulator 8 of any type suitable for the purpose. The sweep-capacitor

12 is connected between grid 22 and ground. Anode 33 of the switch-tube 30 is also connected to this grid. The input signal is applied to the terminal 34, which in turn is connected to the grid 32. Cathode 31 is connected to B—. This arrangement will be recognized as the usual linearized sawtooth sweep-generator, which has an output terminal at 13. Triode 20 is frequently called a sweep-tube which is connected as a cathode follower. The circuit is caused to switch from retrace to the sweep portion of the cycle through action of the switch-tube 30 when it conducts and cuts off respectively. This, of course, is normal operation.

At 40 is a triode connected as a cathode follower and is referred to as the delay tube. Its anode is connected to B+ and its cathode 41 to B— through the usual resistor. Its grid 42 is connected to the movable contact of a potentiometer 14 which is connected between an intermediate point of source B and (B—), as shown.

Grid 22 is also connected to one terminal of a second sweep-capacitor 15 and to the cathode 51 of a unidirectionally conductive diode 50 whose plate is connected to cathode 41. The other plate of sweep-capacitor 15 is connected to the anode 81 of the triode 80 and the cathode 61 of the diode 60 whose anode is connected to B+, as is the cathode of the triode 80. Grid 82 of this triode is connected to the anode 23 and to the grid 92 of the triode 90. Its cathode is connected to B+, and its anode 93 is connected to a suitable source of positive potential B++ and to a brightness output terminal 100.

In this disclosure triode 90 is called the brightness tube, triode 80 the shortening tube, and diode 50 acts to decouple the delay tube 40.

It is noted that cathode 21 is connected to ground through a unidirectional diode 70 whose anode is grounded as shown. This tube acts to clamp the potential of cathode 21 in the output terminal 13, whereby they are restricted to positive potentials above ground.

In the operation of this circuit it is noted that the delay-tube 40, which is a cathode follower, has its grid 42 connected to the contact arm of delay potentiometer 14. When this contact arm is set to ground potential, that is at the upper end of potentiometer 14, cathode follower action adjusts the cathode 41 to approximately ground potential. This potential is also applied through the unidirectional conductor device 50 (to be more fully discussed hereinafter), to grid 22 of the sweep-tube 20, and to sweep-capacitor 12. This can be termed the "no delay" setting of control potentiometer 14, because as soon as the potential of sweep-capacitor 12 increases, cathode 51 of the device 50 is upvolted enough to cut off conductivity and thus decouple the delay-tube 40 from the circuit.

The sweep-voltage developed on sweep-capacitor 12 is also applied to the bottom of auxiliary sweep-capacitor 15, whose upper plate is allowed to be freely upvolted and downvolted in unison with its bottom plate, since tubes 60 and 80 are at this time non-conductive.

Under these conditions it is apparent, therefore, that the no delay setting causes the sweep-generator to respond in its normal manner to a negative signal applied to the grid 32 of the switch-tube 30.

The zero potential tube 70 is connected in the circuit so that if the potential at cathode 21 goes lower than ground potential, this device becomes conductive and so clamps cathode 21 and output terminal 13, which as previously stated, restricts them to positive potential above ground.

To achieve a delay the contact arm of control potentiometer 14 is moved downwardly so that the negative bias is applied to grid 42. Again, due to cathode follower action, cathode 41 assumes a similar negative potential which is applied through unidirectional conductive device 50 to the grid 22 of switch-tube 20. Cathode follower action tends to downvolt the cathode 21, but tube 70 quickly clamps and prevents this. Sweep-tube 20 is therefore cut off by its negative grid 22. As a result anode 23 is upvolted, thereby upvolting grids 82 and 92, rendering both the shorting tube 80 and the brightness tube 90 conductive.

The sweep circuit now charges sweep-capacitor 12 which is connected directly to ground and auxiliary sweep-capacitor 15 which is connected to ground through the now conductive shorting tube 80 and the usual by passed B+ supply. Since these two capacitors are in parallel the sweep-generator causes the sweep-voltage to increase very slowly, hereinafter called the "slow sweep action," permitting a long delay.

This delay period ends when the sweep-voltage approaches the start up potential of grid 22 of sweep-tube 20. At this point sweep-tube 20 becomes conductive. Its downvolted plate cuts off shorting tube 80, breaking the circuit of auxiliary sweep-capacitor 15, restoring the original sweep speed. Brightness tube 90 is also cut off, permitting upvolted plate 93 to increase the brightness voltage. The increased sweep-voltage soon upvolts cathode 51 of diode 50, thus decoupling delay tube 40.

To summarize this operation it may be seen that the normal operation of the sweep-generator may be obtained without introducing any delay at all. On the other hand, with the circuit illustrated it is possible to introduce a controllable delay during which the sweep speed is decreased. At the end of the delay period the normal sweep speed is reestablished.

During the delay period brightness tube 90 being rendered conductive, its anode 93 is downvolted lowering the brightness voltage at terminal 100. The change in brightness voltage is very sharp as it is the result of two stages of amplification, that of the brightness tube 90 and of the sweep-tube 20.

The resultant action is rapid enough to produce a precipitous increase and decrease of the brightness voltage. The amplitude of this voltage is such that the spot is completely extinguished during rest and retrace, thus protecting the tube screen from burns.

It was previously noted that diode 50 decouples delay tube 40 when the sweep-generator upvolts its cathode 51 above its anode 53. This kind of action for a unidirectional conductive device is well known in the art, as is the fact that the conductivity takes place when its anode 53 is at a higher potential than its cathode 51. It will be noted that the potential of anode 53 is determined by the setting of the delay potentiometer 14 and the cathode follower action of delay tube 40. While the output sweep-voltage at terminal 13 is restricted to positive values above ground, this limitation does not apply to grid 22, sweep-capacitor 12, anode 33 and cathode 51 which are conductively connected together. Due to the action of the sweep generator these elements are upvolted to a limit set by the control pulse applied to grid 32.

Similarly, when switch-tube 30 is conductive these elements are downvolted towards the potential at B—. At some point during this downvolting cathode 51 falls below the potential of anode 53, conductivity takes place and downvolting is halted. Thus, a lower limit of the sweep-voltage is established even though this value does not appear at terminal 13. If this lower limit is at ground potential sweep-tube 20 immediately becomes conductive and normal sweep action occurs, the sweep-voltage appearing at 13. However, if this lower limit is below ground potential the previously described slow sweep action takes place at elements 22, 12, 33 and 51, but not at 13 until grid 22 is above ground potential, whereupon the sweep-tube 20 becomes conductive and normal sweep action replaces the slow sweep action. Since only the normal sweep action appears at output terminal 13, a delay or rest period is thus introduced.

During the normal operation of the sweep-generator the potential of the upper plate of auxiliary sweep-capacitor 15 rises and falls freely, as previously explained. The first time this upper plate is downvolted, diode 60 becomes conductive because its anode 63 was at a higher potential than its cathode 61 and capacitor 15 was charged up. At subsequent upvoltings the potential of cathode 61 was therefore higher than that on anode 63, so that there was no conduction. Also, during subsequent downvoltings, the cathode potential never fell below the value of the first downvolting, so again there was no conduction. Shorting tube 80 was also cut off, thus explaining why the upper plate of capacitor 15 was electrically free to rise and fall in potential.

During the upvolting of the delay period, however, the upper plate of capacitor 15, instead of being at open circuit due to the two non-conductive tubes 60 and 80, is allowed to charge up through conductive shorting tube 80. The additional charging action on auxiliary sweep-capacitor 15 causes the slow sweep action. This charge must be dissipated during retrace downvolting so that another charge can build up during the next upvolting. The unidirectional conductive device 60 permits this discharging action by becoming conductive during downvolting when the potental between its electrodes tends to become greater than its start up voltage. In this manner auxiliary sweep-capacitor 15 is discharged during downvolting or retrace and charged up during the delay interval.

Thus it may be seen that the instant invention provides a sweep-generator with the following improved characteristics. A delay interval ranging progressively upward from true zero is obtained. The sweep speed during this interval may be controlled by the choice of value for the auxiliary sweep-capacitor. Only one delay control is required and it may be calibrated. The sweep which appears depends, regardless of delay interval, only on the time constant elements of the basic sweep-generator and is not affected by the associated circuitry. Fully synchronized brightness voltage without roll-off may be obtained.

From the foregoing description it will be apparent to those skilled in the art that the subject matter of this invention may be obtained with some variations, and I prefer, therefore to be limited only by the appended claims.

What is claimed is:

1. A delay sweep circuit comprising: a sweep capacitor across which a sweep voltage is generated, a first terminal of said capacitor being connected to a source of fixed potential; a charging circuit comprising a resistor connected in series between a second terminal of said capacitor and a source of positive potential; a switch tube having an anode connected to said second terminal and a cathode connected to a source of negative potential; means causing said switch tube to be conductive during part of the time to force said second terminal to a potential negative with respect to said first-named source, and to be non-conductive at other times to allow said capacitor to charge through said charging circuit so as to make said second terminal increasingly positive with respect to said first-named source; an amplifier tube having a control grid connected to said second terminal and having a cathode; a cathode load resistor connected between said last-named cathode and said source of negative potential; and means including a clamp tube comprising an anode connected to said first-named source and a cathode connected to the cathode of said amplifier, to prevent the cathode of said amplifier from becoming greatly negative with respect to the potential of said first-named source, whereby said amplifier tube is thereby made non-conductive while said switch tube is conductive and for a delay period after the switch tube becomes non-conductive until said capacitor charges up to the cut-off potential of said amplifier tube.

2. An adjustable delay sweep circuit comprising: a source of generated sweep voltage comprising a grounded sweep capacitor and an amplifier connected to said capacitor to amplify the sweep voltage generated thereacross, said amplifier having an output terminal; a first source of operating potential having a positive terminal, a negative terminal, and an intermediate terminal connected to ground; a clamp tube having a cathode connected to said output terminal, and an anode connected to ground, said clamp tube establishing a lower reference potential for the output sweep voltage whereby said amplifier is held non-conductive for a delay period after the start of said sweep voltage; a decoupling tube having a cathode connected to the ungrounded plate of said sweep capacitor, and an anode; an adjustable source of bias applied between said negative terminal and said decoupling tube anode to cause the starting level of the generated sweep voltage to be below said reference potential, the delay interval corresponding to the difference between said reference potential and said starting level, a brightness tube having a cathode connected to said positive terminal, an anode connected through a load resistor to a still more positive source of potential, a grid; a brightness output terminal connected to said anode; and means causing said brightness tube to become suddenly conductive at the end of said delay interval, said means comprising a connection between an output terminal of said amplifier and the grid of said brightness tube to upvolt said grid at the end of said delay period when said amplifier suddenly becomes conductive.

3. An adjustable delay sweep circuit comprising: a source of generated sweep voltage comprising a grounded sweep capacitor and an amplifier connected to said capacitor to amplify the sweep voltage generated thereacross, said amplifier having an output terminal; a first source of operating potential having a positive terminal, a negative terminal, and an intermediate terminal connected to ground; a clamp tube having a cathode connected to said output terminal, and an anode connected to ground, said clamp tube establishing a lower reference potential for the output sweep voltage whereby said amplifier is held non-conductive for a delay period after the start of said sweep voltage; a decoupling tube having a cathode connected to the ungrounded plate of said sweep capacitor, and an anode; an adjustable source of bias applied between said negative terminal and said decoupling tube anode to cause the starting level of the generated sweep voltage to be below said reference potential, the delay interval corresponding to the difference between said reference potential and said starting level; an auxiliary sweep capacitor having a first plate connected to the ungrounded plate of said sweep capacitor, and a second plate; a shorting tube having a cathode connected to said positive terminal of said first source of potential, a grid, and an anode; a discharging tube having an anode connected to said positive terminal of said first source of potential, and a cathode; a connection between said second plate of said auxiliary sweep capacitor, said anode of said shorting tube, and said cathode of said discharging tube; and means causing said shorting tube to become conductive during said delay interval.

4. A delay sweep circuit comprising: a sweep capacitor across which a sweep voltage is generated, said capacitor having one terminal connected to ground; a source of positive potential; a charging circuit connected between said source of potential and the other terminal of said capacitor; means including a switch tube having an anode connected to said other terminal and a cathode connected to a source of potential negative with respect to ground to force said other terminal to a potential which is negative with respect to ground when said switch tube is conductive, and to allow said capacitor to charge through said charging circuit so as to make said other terminal increasingly positive with respect to ground when said switch tube is non-conductive; an amplifier having an input connected to said other terminal and having an output terminal; and means, including a clamp tube having an anode connected to ground and a cathode connected to said output terminal, to maintain the voltage at said output terminal at a substantially fixed level until said capacitor has charged up to a predetermined voltage, the potential at said output terminal then following the rise of voltage across said capacitor.

5. The delay sweep circuit of claim 4 comprising in addition a second amplifier tube having an anode connected to said source of positive potential, a cathode, and a control grid connected to a point of potential variable between said first-named source and said negative source; a connection between the cathode of said second amplifier tube and the anode of said switch tube to form a voltage divider to control the voltage on the anode of said switch tube when said switch tube is conductive.

6. The delay sweep circuit of claim 5 in which said connection comprises a diode having its cathode connected to the anode of said switch tube and having its anode connected to the cathode of said second amplifier.

7. The delay sweep circuit of claim 1 comprising in addition a variable source of potential intermediate the potential of said first-named source and the potential of said negative source; and a diode having an anode connected to said source of variable potential and having a cathode connected to the anode of said switch tube whereby the voltage of the anode of said switch tube is controlled during periods when said switch tube is conductive.

8. The delay sweep circuit of claim 7 in which said source of variable potential comprises an amplifier tube having an anode connected to said source of positive potential, a control grid, and a cathode; a cathode load resistor connected in series between the cathode of said last-named amplifier tube and said source of negative potential; a potentiometer connected in series between said first-named source and said source of negative potential, the arm of said potentiometer being connected to the grid of said last-named amplifier tube; and a connection between said cathode load resistor and the anode of said diode.

9. The circuit of claim 3 wherein said means includes a connection between the grid of said shorting-tube and the anode of said sweep-tube.

10. A sweep generator having an adjustable delay before the occurrence of an output signal, comprising: means to produce a sweep signal which starts below and then exceeds a given level, said means comprising a sweep capacitor, means to discharge said capacitor to a predetermined value which is below said given level, and means to charge said capacitor; an amplifier having an input and an output terminal; means to prevent the signal at said output terminal from dropping below said given level; means to apply said sweep signal to said input terminal, whereby there is no output signal for the interval during which said sweep signal varies from said predetermined value to said given level, thus producing a delay; and means to connect an auxiliary capacitor in parallel with said capacitor.

References Cited in the file of this patent

UNITED STATES PATENTS

| | | |
|---|---|---|
| 2,532,534 | Bell | Dec. 5, 1950 |
| 2,557,770 | Scole | June 19, 1951 |
| 2,570,875 | Sink | Oct. 9, 1951 |
| 2,688,075 | Palmer | Aug. 31, 1954 |
| 2,695,955 | Casey | Nov. 30, 1954 |
| 2,701,306 | Bess | Feb. 1, 1955 |
| 2,743,357 | Casey | Apr. 24, 1956 |
| 2,745,956 | Baker | May 15, 1956 |
| 2,779,870 | Henry et al. | Jan. 29, 1957 |

UNITED STATES PATENT OFFICE

CERTIFICATE OF CORRECTION

Patent No. 2,871,350 January 27, 1959

Robert F. Casey

It is hereby certified that error appears in the printed specification of the above numbered patent requiring correction and that the said Letters Patent should read as corrected below.

Column 1, line 21, for "while" read -- which --; column 2, line 31, for "shortening" read -- shorting --.

Signed and sealed this 5th day of May 1959.

(SEAL)
Attest:

KARL H. AXLINE
Attesting Officer

ROBERT C. WATSON
Commissioner of Patents